United States Patent
Bergs et al.

(10) Patent No.: US 11,366,840 B2
(45) Date of Patent: *Jun. 21, 2022

(54) LOG-AIDED AUTOMATIC QUERY EXPANSION APPROACH BASED ON TOPIC MODELING

(71) Applicant: Airbnb, Inc., San Francisco, CA (US)

(72) Inventors: Russell W. Bergs, Dallas, GA (US); Yu Deng, Yorktown Heights, NY (US); Kaoutar El Maghraoui, Yorktown Heights, NY (US); Matthew R. Koozer, Smyrna, GA (US); HariGovind V. Ramasamy, Ossining, NY (US); Soumitra Sarkar, Cary, NC (US); Rongda Zhu, Urbana, IL (US)

(73) Assignee: Airbnb, Inc., San Francisco, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/827,667

(22) Filed: Mar. 23, 2020

(65) Prior Publication Data
US 2020/0226158 A1 Jul. 16, 2020

Related U.S. Application Data

(63) Continuation of application No. 15/893,603, filed on Feb. 10, 2018, now Pat. No. 10,628,467, which is a continuation of application No. 14/790,447, filed on Jul. 2, 2015, now Pat. No. 9,916,377.

(51) Int. Cl.
*G06F 7/00* (2006.01)
*G06F 16/332* (2019.01)

(52) U.S. Cl.
CPC .................. *G06F 16/332* (2019.01)

(58) Field of Classification Search
CPC ..................................... G06F 16/332
USPC .................................. 707/600–899
See application file for complete search history.

(56) References Cited

U.S. PATENT DOCUMENTS

| | | | |
|---|---|---|---|
| 6,411,950 B1 | 6/2002 | Moricz et al. | |
| 8,306,967 B2 | 11/2012 | Galitsky et al. | |
| 9,916,377 B2 | 3/2018 | Bergs et al. | |
| 10,628,467 B2 | 4/2020 | Bergs et al. | |
| 2008/0109416 A1* | 5/2008 | Williams | G06F 16/951 |
| 2017/0004224 A1 | 1/2017 | Bergs et al. | |
| 2018/0165355 A1 | 6/2018 | Bergs et al. | |

OTHER PUBLICATIONS

Hassan Saneifar et.al., Enhancing Passage Retrieval in Log Files by Query Expansion based on Explicit And Pseudo Relevance Feedback. Computers in Industry vol. 65, Issues 6, Aug. 2014, pp. 937-951 (provided as preprint pp. 1-30).

(Continued)

*Primary Examiner* — Isaac M Woo
(74) *Attorney, Agent, or Firm* — Schwegman Lundberg & Woessner, P.A.

(57) ABSTRACT

A base query having a plurality of base query terms is obtained. A plurality of problem log files are accessed. Words, contained in a corpus vocabulary, are extracted from the plurality of problem log files. Based on the words extracted from the plurality of problem log files, a first expanded query is generated from the base query. The corpus is queried, via a query engine and a corpus index, with a second expanded query related to the first expanded query.

20 Claims, 9 Drawing Sheets

(56) References Cited

OTHER PUBLICATIONS

David M. Biei, et al. Latent Dirichlet Allocation. Journal of Machine Learning Research 3 (2003); Published Jan. 2003, pp. 993-1022.
Charles Sutton, et al. Joint Parsing and Semantic Role Labeling, DARPA report dated 2005, provided as CiteSeerX version 2005, pp. 1-5.
Strohman, T., Metzler, D., Turtle, H., & Croft, W. B. (May 2005) Indri: A language model-based search engine for complex queries. In Proceedings of the International Conference on Intelligent Analysis (vol. 2, No. 6, pp. 1-6).
Mallet: Machine Learning for Language E Toolkit. Downloaded from http://mallet.cs.umass.edu/ on Mar. 23, 2015, pp. 1-3.
Xing Yi and James Allan, A Comparative Study of Utilizing Topic Models for Information Retrieval, in M. Boughanem et al. (Eds): ECIR 2009, LNCS 5478, pp. 29-41, 2009.
Paul J. Otterstedt, List of IBM Patents or Patent Applications Treated as Related, pp. 1-2, Apr. 14, 2020.
"U.S. Appl. No. 14/790,447, Non Final Office Action dated Jun. 29, 2017", 8 pgs.
"U.S. Appl. No. 14/790,447, Response filed Sep. 29, 2017 to Non Final Office Action dated Jun. 29, 2017", 7 pgs.
"U.S. Appl. No. 14/790,447, Notice of Allowance dated Oct. 26, 2017", 5 pgs.
"U.S. Appl. No. 15/893,603, Non Final Office Action dated Aug. 28, 2019", 8 pgs.
"U.S. Appl. No. 15/893,603, Response filed Nov. 29, 2019 to Non Final Office Action dated Aug. 28, 2019", 7 pgs.
"U.S. Appl. No. 15/893,603, Notice of Allowance dated Dec. 16, 2019", 6 pgs.

\* cited by examiner

| Number | Document Title | Snippet | Confidence |
|---|---|---|---|
| 1 | 10009028 (POWER6) | ...-01.ibm.com/support/knowledgecenter/POWER6/area7/10009028.htm http://www-01.ibm.com/support/knowledgecenter/POWER6/area7/10009028.htm knowledgecenter POWER6 10009028 10009028 10009028 10009028 Explanation SPCN Licensed Internal Code is not... | 100% |
| 2 | 10009028 (POWER8) | ...-01.ibm.com/support/knowledgecenter/POWER8/p8eai/10009028.htm http://www-01.ibm.com/support/knowledgecenter/POWER8/p8eai/10009028.htm knowledgecenter POWER8 10009028 10009028 10009028... | 97% |
| 3 | 10009028 (POWER7) | ...-01.ibm.com/support/knowledgecenter/POWER7/p7eail/10009028.htm http://www-01.ibm.com/support/knowledgecenter/POWER7/p7eail/10009028.htm knowledgecenter POWER7 10009028 10009028 Subscribe to this information IBM PowerLinux information 10009028... | 96% |

*FIG. 1A*

| Number | Document Title | Snippet | Confidence |
|---|---|---|---|
| 4 | 10009028 (POWER5 POWER6) | ...-01.ibm.com/support/knowledgecenter/POWER5/area7/10009028.htm http://www-01.ibm.com/support/knowledgecenter/POWER5/area7/10009028.htm knowledgecenter POWER5 POWER6 10009028 10009028 10009028 Explanation SPCN Licensed Internal Code is not... | 95% |
| 5 | (1000) Reference codes (POWER6) | ...100091DD 10009023 100091DE 10009024 10009025 10007640 10007641 10009028 10009029 1000902D 10009031 10009032 10009033 10009034 100009035...10009022 10009023 10009024 10009024 10009025 10009028 10009028 10009029 10009029 1000902D 10009031 10009032... | 55% |
| 6 | (1000) Reference codes (POWER5 POWER6) | ...100091DD 10009023 100091DE 10009024 10009025 10007640 10007641 10009028 10009029 1000902D 10009031 10009032 10009033 10009034 100009035...10009022 10009023 10009024 10009024 10009025 10009028 10009028 10009029 10009029 1000902D 10009031 10009032... | 50% |

*FIG. 1B*

| Number | Document Title | Snippet | Confidence |
|---|---|---|---|
| 1 | 10009028 (POWER7) | http://www-01.ibm.com/support/knowledgecenter/POWER7/p7eai/10009028.htm knowledgecenter POWER7 10009028 10009028 Subscribe to this information POWER7 information 10009028 Explanation SPCN Licensed Internal Code is not valid. Response The Licensed Internal Code in the primary node is not valid. The code... | 100% |
| 2 | (1000) Reference Codes (POWER7) | http://www-01.ibm.com/support/knowledgecenter/POWER7/p7eai/1000_info.htm knowledgecenter POWER7 10003125 10007602 10009109 10007603 10001500 10001501 10001502...100091DD 10009023 100091DE 10009024 10009025 10007640 10007641 10009028 10009029 10009002D 10009031 10009032 10009033 10009034 10009035...1000) Reference codes Subscribe to this information POWER7 information (1000) Reference codes 100000A0 100000AA 100000AC... | 97% |
| 3 | 10009028 (POWER6) | ...-01.ibm.com/support/knowledgecenter/POWER6/area7/10009028.htm http://www-01.ibm.com/support/knowledgecenter/POWER6/area7/10009028.htm knowledgecenter POWER6 10009028 10009028 10009028 Explanation SPCN Licensed Internal Code is not... | 67% |
| 4 | 10009028 (POWER8) | ...-01.ibm.com/support/knowledgecenter/POWER8/p8eai/10009028.htm http://www-01.ibm.com/support/knowledgecenter/POWER8/p8eai/10009028.htm knowledgecenter POWER8 10009028 10009028 10009028... | 66% |

FIG. 2

| hdisk | 0.065 | battery | 0.071 | scsi | 0.017 |
| aix | 0.056 | cache | 0.026 | lun | 0.016 |
| fscsi | 0.020 | recovery | 0.020 | command | 0.014 |
| enable | 0.016 | control | 0.019 | troubleshoot | 0.012 |
| false | 0.012 | failure | 0.016 | technical | 0.012 |
| root | 0.012 | learn | 0.014 | refer | 0.012 |
| ... | | ... | | ... | |

Probabilities in the distribution

*FIG. 3*

LOG-AIDED AUTOMATIC QUERY EXPANSION APPROACH BASED ON TOPIC MODELING

CROSS-REFERENCE TO RELATED APPLICATIONS

This application is a continuation of U.S. patent application Ser. No. 15/893,603 filed Feb. 10, 2018, which is in turn a continuation of U.S. patent application Ser. No. 14/790,447 filed Jul. 2, 2015, now U.S. Pat. No. 9,916,377. The complete disclosures of U.S. patent application Ser. Nos. 15/893,603 and 14/790,447 are expressly incorporated herein by reference in their entireties for all purposes.

FIELD OF THE INVENTION

The present invention relates to the electrical, electronic, and computer arts, and, more particularly, to knowledge-based diagnostics and information retrieval, and the like.

BACKGROUND OF THE INVENTION

Query expansion is the general process of reformulating a seed query to improve retrieval performance. Typically, users don't form queries using the best terms. Some automatic query extension (AQE) techniques use a corpus topic model.

SUMMARY OF THE INVENTION

Principles of the invention provide techniques for a log-aided automatic query expansion approach based on topic modeling. In one aspect, an exemplary method includes the steps of obtaining a base query having a plurality of base query terms; accessing a plurality of problem log files; and extracting words, contained in a corpus vocabulary, from the plurality of problem log files. A further step includes, based on the words extracted from the plurality of problem log files, generating a first expanded query from the base query. An even further step includes querying the corpus, via a query engine and a corpus index, with a second expanded query related to the first expanded query.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example, improving accuracy of search results and reducing the time for problem determination.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 1A and 1B show an exemplary query with quality issues;

FIG. 2 shows an enhanced query;

FIG. 3 shows topic modeling word distribution;

DETAILED DESCRIPTION OF PREFERRED EMBODIMENTS

One or more embodiments provide a log-aided automatic query expansion approach based on topic modeling. Query expansion is the general process of reformulating a seed query to improve retrieval performance. Users don't always form queries using the best terms. Some enhancement to the query may clarify the information that is needed. One or more embodiments automatically form better queries to enhance the retrieval performance. Automatic query expansion is conducted by the search platform, without requiring additional user input. An alternate is interactive query expansion (IQE). AQE may result in a precision/recall tradeoff, but ideally provides an overall benefit. Some current AQE methods involve usage of query logs; however, diagnostic logs have not been used heretofore. Non-limiting examples of diagnostic logs include operating systems logs, error logs, a major event log of midrange storage systems, and the like.

FIGS. 1A and 1B show a case where an agent chose the error code "10009028" as the query to search for results. FIG. 2 shows an improvement wherein, using log data, the exact platform version for the error is found and the following expanded query is formed: "10009028 POWER7." The first hit in the improved query is the sought after result, whereas the first query gave results that belong to different platforms.

Refer now to FIG. 3 and consider topic modeling. Modeling can be based on the whole corpus 406 (discussed below) or the top K documents (i.e., if the K documents most relevant to the topic are known, the topic model need not be built for the entire corpus—a certain query is run a priori to pick the K most relevant documents, and the topic modeling is then run on the top K documents to keep the model smaller and more relevant). For a corpus with a variety of topics, first select the relevant documents (top document returned) to rule out irrelevant topics. An indexed knowledge source is typically of smaller scale and with more concentrated topics; accordingly, run topic modeling on the whole corpus once and keep the results for future use. Consider the output of Latent Dirichlet Allocation (LDA). For each topic t, store the word distribution of that topic p(w|t). FIG. 3 shows topics (e.g., "hdisk") with corresponding word distributions p(w|t) (e.g., for "hdisk," 0.065).

Figure 4:
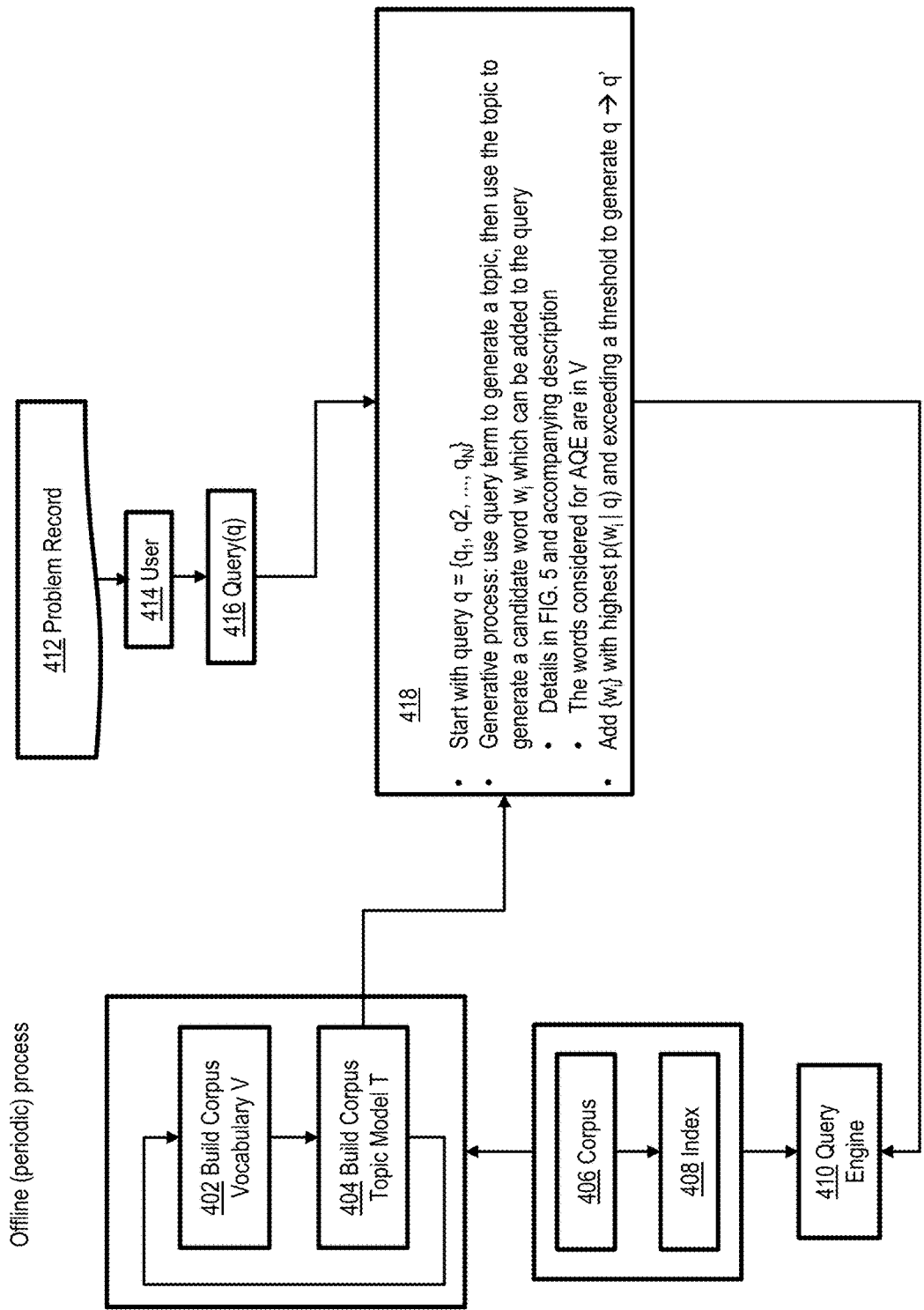
FIG. 4 shows prior art AQE techniques use a corpus topic model.

FIG. 4 shows a prior art technique for AQE using a corpus topic model as developed at the University of Massachusetts. Reference is made to Xing Yi and James Allan, A Comparative Study of Utilizing Topic Models for Information Retrieval, In Proceedings of the 31th European Conference on IR Research on Advances in Information Retrieval (ECIR '09), Pages 29-41, expressly incorporated by reference herein in its entirety for all purposes. Periodically, an offline process is conducted. In particular, in step 402, a corpus vocabulary V is built, while in step 404, a corpus topic model T is built. The corpus 406 is indexed as seen at 408 and the index is accessed via a query engine 410. The skilled artisan is able to index a corpus to create an index that can be accessed by a query engine. User 414 (e.g., an information technology (IT) customer service representative) accesses a problem record 412. Based on this record, the user formulates a query "q" as seen at 416.

As seen at 418, start with query q denoted by a set of terms as follows:

$$q=\{q_1, q_2, \ldots, q_N\} \quad (1)$$

Then, undertake a generative process, by using a query term to generate a topic, and then using the topic to generate a candidate word $w_i$ which can be added to the query, as follows:

$$p(w|q)=\Sigma_i p(w|t_i)p(t_i|q) \quad (2)$$

where $t_i$ is the topic obtained from LDA. Note that $p(w|t_i)$ can be obtained directly from the word distributions, for $p(t_i|q)$. According to Bayes' Rule:

$$p(t_i|q) \propto p(t_i)p(q|t_i). \quad (3)$$

The skilled artisan will appreciate that step 404 applies LDA to the corpus to build the topic model T; the topic model T is used by step 418 as one of its inputs. The topic model has the topics that are used to generate the candidate words in step 418.

Given the LDA model and the query q as a new document, $p(t_i)$ can be inferred directly, which is just the topic mixture weight for q. Further, $p(q|t_i)$ can be computed from the word distribution as shown in FIG. 5 using the following equation:

$$p(q_i t_i)=p(q_1|t_i)*p(q_2|t_i) \ldots *p(q_N|t_i), \text{ where } p(t_i)=i\text{'th element of 'theta' in model.} \quad (4)$$

Figure 5:
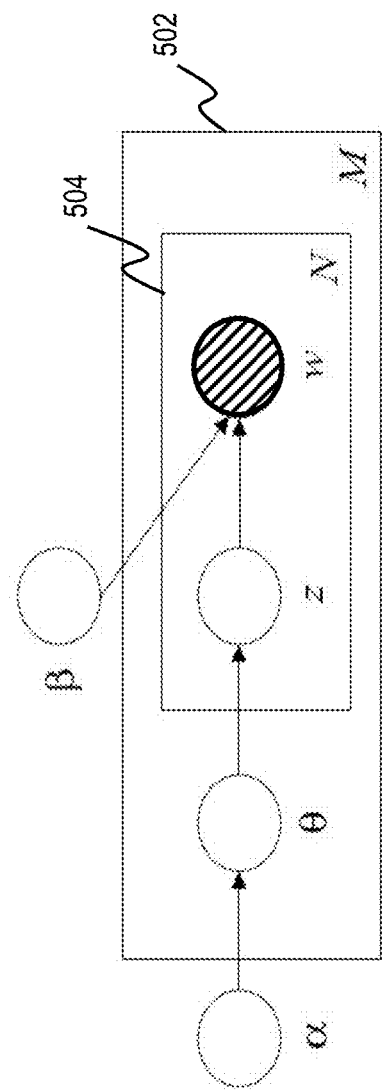
FIG. 5 shows a graphical model representation of Latent Dirichlet Allocation (LDA) as known in and of itself from the prior art, and usable in one or more embodiments—see David M. Blei et al., Latent Dirichlet Allocation, Journal of Machine Learning Research 3 (2003) 993-1022, expressly incorporated by reference herein in its entirety for all purposes.

Note that FIG. 5 shows a graphical model representation of LDA. The boxes are "plates" representing replicates. The outer plate 502 represents documents, while the inner plate 504 represents the repeated choice of topics and words within a document. The skilled artisan will be familiar with the above-mentioned David M. Blei et al. paper on Latent Dirichlet Allocation (LDA) per se, and given, the teachings herein, will be able to employ LDA (for example, using toolkits or the like) to implement one or more embodiments. Furthermore in this regard, note that available tools can be used to implement LDA to build the topic model T; for example, the MALLET toolkit which allows an LDA routine to be called via an API (McCallum, Andrew Kachites, "MALLET: A Machine Learning for Language Toolkit," 2002, available from the University of Massachusetts, Amherst, Mass., USA, expressly incorporated by reference herein in its entirety for all purposes).

Note that the words considered for AQE are in the vocabulary V.

Following the generative process, add the $\{w_i\}$ that has the highest $p(w_i|q)$ and also exceeds a threshold to generate an enhanced query q', i.e., q→q'. The threshold can be picked empirically via experimental evaluation. In an alternative approach, pick the top "N" number of words (N=5 in a non-limiting example, can also be determined empirically).

Figure 6:
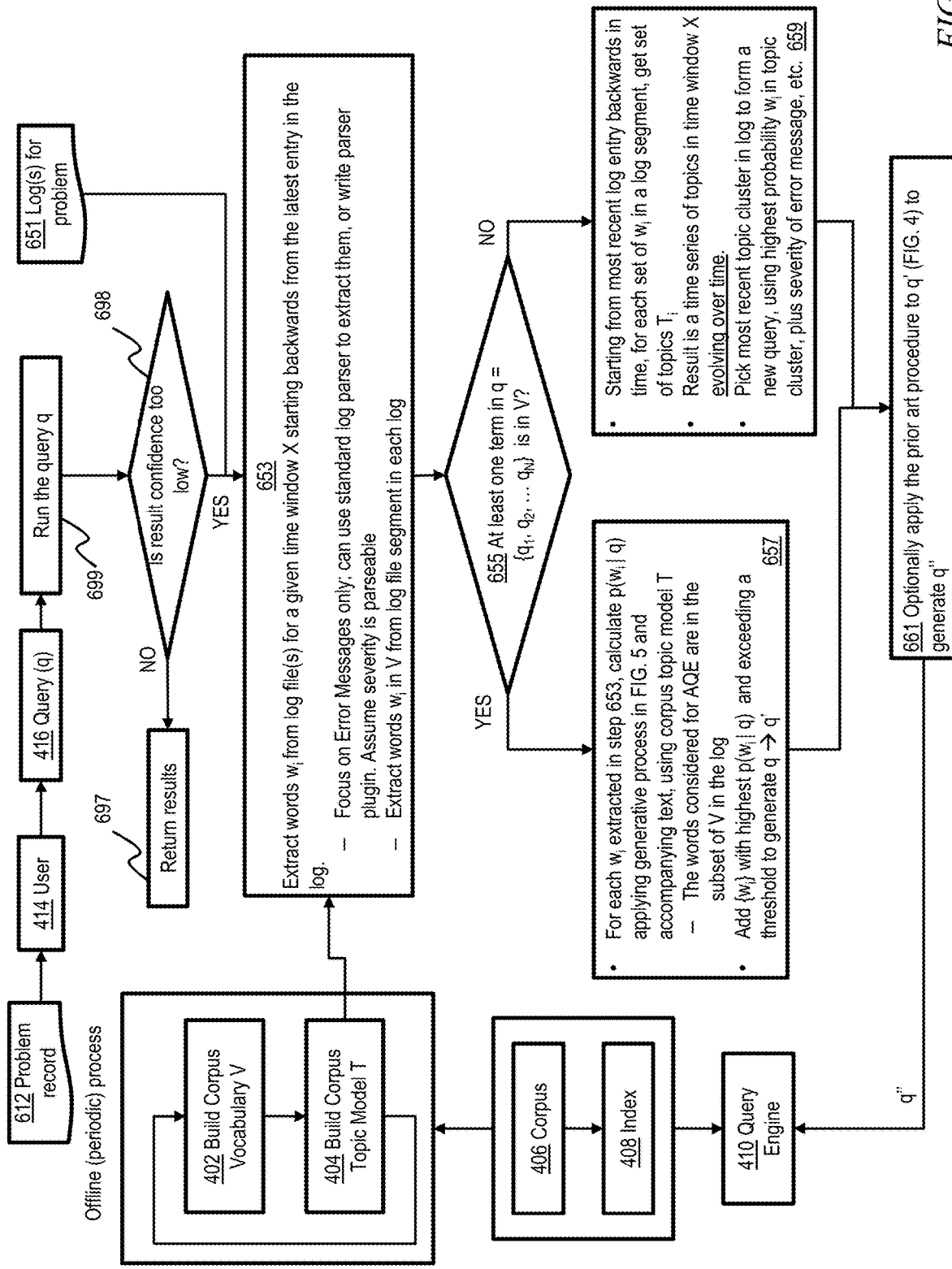
FIG. 6 shows AQE/AQR (automatic query rewriting) using log terms and a corpus topic model.

Refer now to FIG. 6, which depicts AQE/AQR using log terms and a corpus topic model, in accordance with an exemplary embodiment (note that AQR contemplates rewrite of queries other than by expansion; e.g., to remove certain original query terms via heuristics or the like). Elements similar to those in FIG. 4 have received the same reference character. In step 402, a corpus vocabulary V is built, while in step 404, a corpus topic model T is built. The corpus 406 is indexed as seen at 408 and the index is accessed via a query engine 410. User 414 (e.g., an information technology (IT) worker) accesses a problem record 612. Based on this record, the user formulates a query "q" as seen at 416.

This query is run in step 699. In decision block 698, it is determined whether the confidence in the results is too low. If not, i.e., NO branch, confidence acceptable, return the results in step 697. The skilled artisan will know from experience whether he or she is satisfied with the level of confidence. If the confidence results are too low, i.e., YES branch, confidence not acceptable, proceed to step 653, which also takes as an input one or more logs 651. In particular, in step 653, extract words $w_i$ from log file(s) 651 for the problem for a given time window X starting backwards from the latest entry in the log. In one or more embodiments, focus on error messages only. In a non-limiting example, use a standard log parser to extract the error messages. Alternatively, a parser plugin can be written to handle this task. One or more embodiments assume that severity is parseable. Extract words $w_i$ in vocabulary V from a log file segment in each log. The skilled artisan will appreciate that step 404 applies LDA to the corpus to build the topic model T; the topic model T is used by step 653 as one of its inputs. The topic model has the topics that are used in the technique depicted in FIG. 6.

In decision block 655, determine whether at least one term in q=$\{q_1, q_2, \ldots q_N\}$ is in V. If so, as per the "YES" branch, proceed to step 657. In step 657, for each $w_i$ extracted in step 653, calculate $p(w_i|q)$, applying the generative process in FIG. 5 and accompanying text, using the corpus topic model T. The words considered for AQE are in the subset of V in the log. Add $\{w_i\}$ with the highest $p(w_i|q)$ and exceeding a threshold to generate a revised query q', i.e., q→q'. Proceed then to optional step 661, discussed below, or else directly to the query engine 410.

If no terms in q are in V, as per the "NO" branch of block 655, proceed to step 659. In step 659, starting from the most recent log entry backwards in time, for each set of $w_i$ in a log segment, get a set of topics $T_i$. Log entries are typically in temporal order. The result is a time series of topics in time window X evolving over time. Pick the most recent topic cluster in the log to add it to the query, using the highest probability $w_i$ in the topic cluster, plus severity of error message, and so on. Proceed then to optional step 661, discussed below, or else directly to the query engine 410.

In optional step 661, apply the prior art procedure (FIG. 4 and accompanying text) to q' to generate q" which is the query supplied to the query engine 410.

Figure 8:
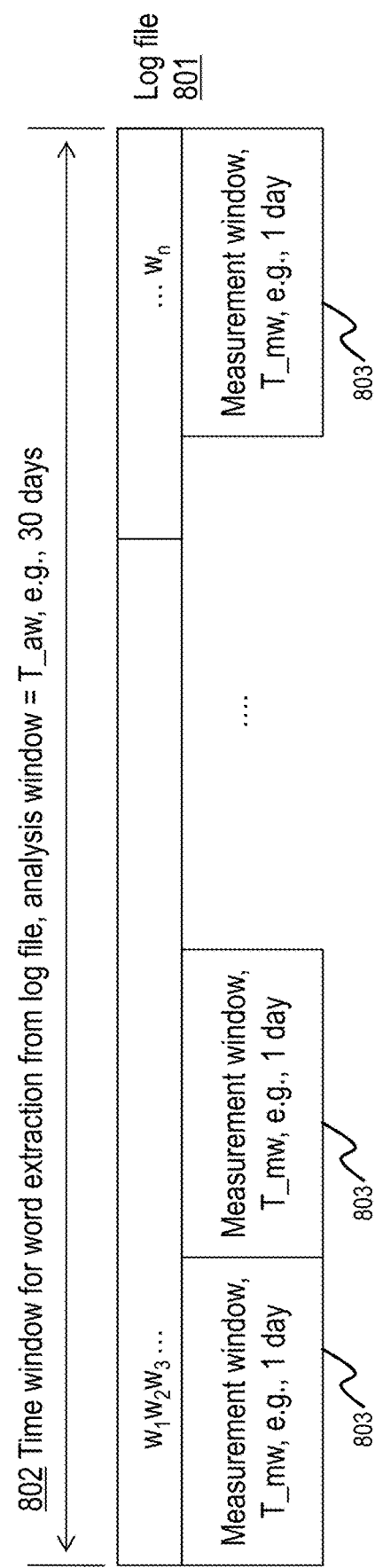
FIG. 8 shows details of topic cluster construction.

Further specific details regarding step 659 are depicted in FIG. 8, which shows aspects of topic cluster construction. A log file 801 includes words $w_1 w_2 w_3 \ldots w_n$. A time window 802 for word extraction from the log file could be, for example, 30 days (analysis window T_aw). Consider example topic measurements per T_mw (measurement windows each numbered 803, one-day windows in the non-limiting example), each measurement within parentheses:

(t1, t2, t3), (t1, t2, t3), (t3, t4, t5), (t4, t5, t6), (t4, t5, t6), . . . , . . . (t10, t11, t12, t13)), (t10, t11, t12, t13).

The feature vector above is 13-dimensional. Each feature in T_mw is 0 or 1. One could use weights also. Example topic clusters (i.e., cluster centroids—simplified view since a cluster centroid need not correspond to a measured feature vector) are as follows:

<t1, t2, t3>, <t4, t5, t6>, <t10, t11, t12, t13>: 3 clusters.

In one or more embodiments, from all words in corpus vocabulary V in log analysis time window, T_aw, create feature vector of topics for clustering. In each measurement window, extract the words in V (corpus), and get the topic for each word. The highest probability topic corresponding to each of these words forms the feature vector of topics representing the measurement window. Use unsupervised clustering of topic feature vectors created from each measurement window. Pick the most recent words, whose highest probability topics belong to the same cluster. Use the highest probability $w_i$ corresponding to the topics in that cluster to replace the original query.

A non-limiting example has been provided in the context of an information technology (IT) customer service representative dealing with error log files—indeed, IT support systems have rich diagnostics log data available, and such data can provide critical information for problem diagnosis such as key error codes, symptoms, and the like. However, one or more embodiments can be employed in other domains, particularly where data similar to diagnostics logs exists; for example, the medical domain, electrical engineering, and the like. Another example of an alternative domain is that of an options trader who issues queries to help with placing trades. A "log-aided AQE" search system according to an exemplary embodiment improves the trader's queries by extracting new query terms from contextual information (the "options-related log"). Examples include:

recently accessed news articles about the company—by the trader and/or others recent trades for the same company—by the trader and/or others recent stock market activity—e.g., tech stocks were down last week.

One or more embodiments advantageously provide an inventive method to expand queries using diagnostics logs and corpus topic models. The purpose of one or more embodiments is to enhance information retrieval using machine-generated diagnostics logs. Using machine-generated diagnostics data is particularly challenging due to the lack of rich semantics and the un-structured nature of diagnostics logs. Advantageously, one or more embodiments employ corpus topic models as a bridge to link user-provided queries with critical terms from the diagnostics log.

Thus, one or more embodiments provide a system comprising one or more computer systems, and one or more corpuses which are stored and indexed. The corpuses contain descriptions of domain problems and solutions. The system also includes a topic model of one or more of the corpuses. The topic model has a plurality of topics related to the corpus, and each topic has a plurality of topic words in the corpus that are related to the topic according to a probability of relevance to the respective topic. The system still further includes one or more event logs (or at least an interface to access an externally-maintained event log or logs). Each of the event logs has a listing (sequence) of events relevant to a problem in the domain.

In the exemplary system, an initial user query is concerned with one or more of the problems and includes one or more initial search terms. The initial query is enhanced via a query enhancing process that performs the following steps:

a. determining the relevance between one or more of the initial search terms and one or more of the topic words in the event log;

b. selecting topic words that have a relevance (to the initial search term) which is above a threshold;

c. appending the selected topic words to the initial search terms to create an enhanced query used to search the corpus; and d. selecting one or more topic words from the event log when no search term is in the corpus or the quality of the query is very poor.

In some instances, the knowledge based corpus includes one or more of the following: computer system operation and/or failure documents, supply change operation specifications, medical diagnosis and treatment literature, mechanical system trouble shooting and repair literature, and the like.

In some instances, the event logs include one or more of the following: computer failure event logs, error codes, transportation events, warehousing events, patient test results and/or diagnosis events, equipment maintenance records, activity logs, diary or journal entries, and the like.

In some instances, steps a, b, and c are performed in an iterative manner.

Given the discussion thus far, it will be appreciated that, in general terms, an exemplary method includes the step 416 of obtaining a base query q having a plurality of base query terms. A further step includes accessing a plurality of problem log files 651. A still further step 653 includes extracting words, contained in a corpus vocabulary, from the plurality of problem log files. Based on the words extracted from the plurality of problem log files, a first expanded query is generated from the base query (e.g., in step 657 or 659). An even further step includes querying the corpus, via a query engine 410 and a corpus index 408, with a second expanded query q" related to the first expanded query.

Referring to decision block 655, if at least one of the query terms is in the corpus vocabulary (YES branch), pick one or more words having highest relevance from among the words extracted in the extracting step, based on a topic model of the corpus; and add at least one of the words having the highest relevance to the base query to generate the first expanded query q'. In a non-limiting example, this can be carried out as in step 657.

As noted, in a non-limiting example, words to be added to the query are picked as in step 657. Thus, in some cases, the picking includes, for each given one of the words extracted in the extracting step, calculating a conditional probability of each given one of the words, given the base query (i.e., $p(w_i|q)$), using the topic model of the corpus; and the adding includes adding at least one of the words with a highest value of the conditional probability, and exceeding a first threshold to the base query to generate the first expanded query q'. The threshold can be picked empirically via experimental evaluation. In an alternative approach, pick the top "N" number of words (N=5 in a non-limiting example, can also be determined empirically).

As noted, the second expanded query q" is related to the first expanded query q'. In some instances, the second expanded query is identical to the first expanded query (step 661 skipped). On the other hand, in some cases, the second expanded query is derived from the first expanded query by using the topic model of the corpus to generate a topic for each of a plurality of first expanded query terms of the first expanded query to obtain a plurality of generated topics. For each given one of the plurality of generated topics, generate a candidate word from the vocabulary. Again, refer to step 418. Add one or more of the generated candidate words to the first expanded query to obtain the second expanded query. The generated candidate words to be added to the first expanded query have a highest value of conditional probability, given the first expanded query (i.e., $p(w_j|q_i)$), and exceed a second threshold. Again, refer to step 418.

Consider now the case where decision block 655 yields a "NO." Thus, suppose that the base query is a first base query, and the obtaining, accessing, and extracting steps are repeated for a second base query having a plurality of second base query terms (or the first base query might have yielded a NO in block 655 instead of a YES). If none of the (second) base query terms is in the corpus vocabulary (655: NO), pick one or more most recent ones of the words extracted from the plurality of problem log files, having highest relevance to a single topic cluster in the log files, based on a topic model of the corpus; and replace the base query with at least one of the words having the highest relevance, to obtain the first expanded query. See step 659.

Referring to FIG. 8, in some cases, the picking in this aspect includes selecting given ones of the words from a most recent selection time window; identifying topics with highest relevance to the given ones of the words; identifying topic clusters which contain the topics; selecting a most frequent one of the topic clusters; and selecting those given ones of the words with the highest relevance to the topics in the topic cluster.

The topic clustering could include, for example, analyzing the log files to extract the words belonging to the corpus vocabulary; grouping the words belonging to the corpus vocabulary by a measurement time window; mapping each word in the group of the words to a most relevant topic in the topic model of the corpus; and forming an optimal set of clusters from the set of topics appearing in each the group.

When following the NO branch of block 655 to step 659, step 661 is again optional. Where optional step 661 is skipped, the second expanded query is identical to the first expanded query. Where optional step 661 is not skipped, the second expanded query is derived from the first expanded query by using the topic model of the corpus to generate a topic for each of a plurality of third expanded query terms in the third expanded query to obtain a plurality of generated topics (step 418). For each given one of the plurality of generated topics, generate a candidate word from the vocabulary (step 418). Add one or more of the generated candidate words to the third expanded query to obtain the fourth expanded query. The generated candidate words to be added to the third expanded query have a highest value of conditional probability, given the third expanded query (i.e., $p(w_j|q_i)$), and exceed a second threshold.

Where the obtaining, accessing, and extracting steps are repeated for a second base query having a plurality of second base query terms, the first and second expanded queries can be referred to as third and fourth expanded queries, respectively; when the first base query yields a NO in block 655 instead of a YES, the first and second expanded queries and simply referred to the first and second expanded queries.

One or more embodiments of the invention, or elements thereof, can be implemented, at least in part, in the form of an apparatus including a memory and at least one processor that is coupled to the memory and operative to perform exemplary method steps.

Figure 7:
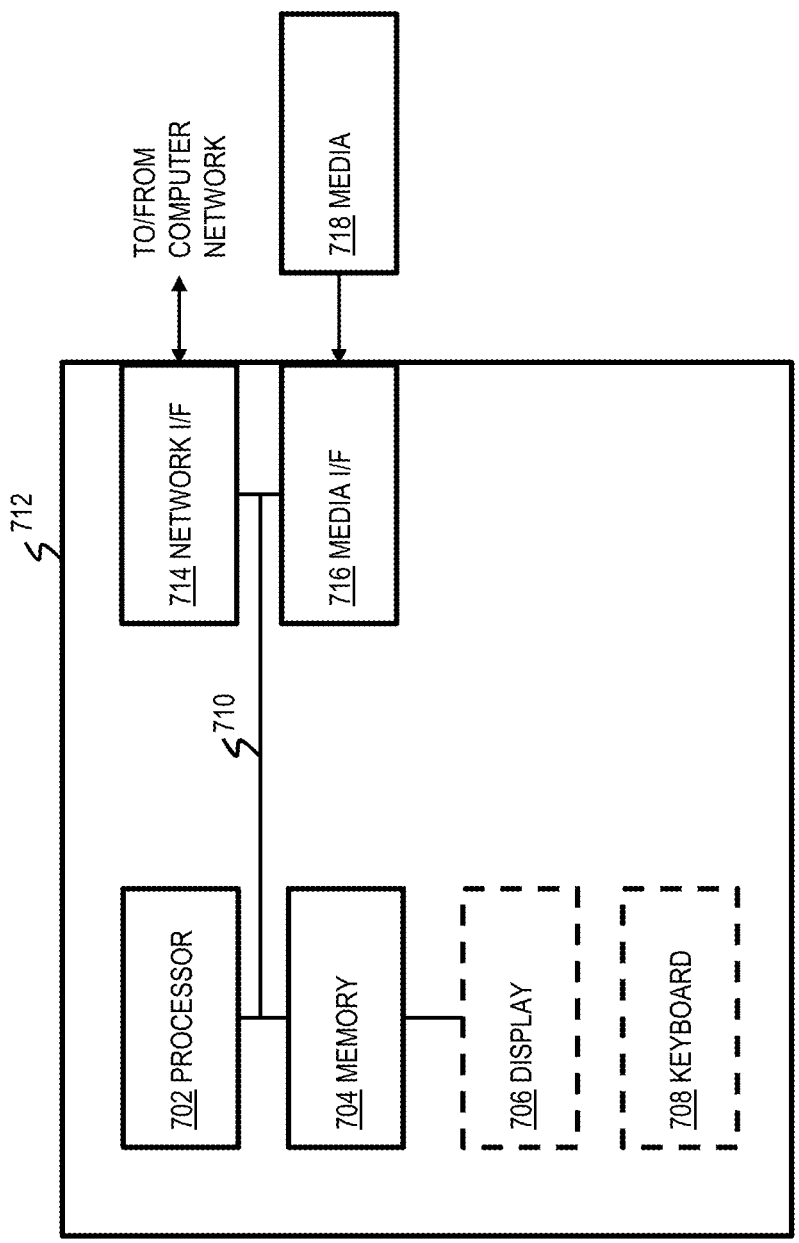
FIG. 7 depicts a computer system that may be useful in implementing one or more aspects and/or elements of the invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. One or more embodiments utilize an existing search engine, such as the Indri search engine mentioned in Indri: A language-model based search engine for complex queries (extended version), Trevor Strohman, Donald Metzler, Howard Turtle and W. Bruce Croft, Center for Intelligence Information Retrieval, University of Massachusetts Amherst, Amherst, Mass., 01003, USA, expressly incorporated herein by reference in its entirety for all purposes, improved with one or more techniques disclosed herein as discussed in connection with steps 653, 655, 657, and 659. One or more embodiments use logs 651 in connection with an enterprise's internal search engine. Tapping into logs 651 improves the search as compared to prior art techniques. Steps 653, 655, 657, and 659 use the log data 651 to improve the query (e.g., by expanding it). Element 408 is the index of the search engine; element 410 is the query engine part of the search engine; blocks 402, 404, 406, 408 represent background or offline processes running on the machine which has the query engine 410 of the search engine. Query 416 is obtained from a user. Query q' or q" is an improved query than query 416 input by the user. The query engine 410 and index 408 are part of an existing search engine. The index is queried with the query engine 410. Steps 653, 655, 657, and 659 implement a pre-processor that enhances the queries before they go into the query engine; steps 653, 657, 659, 661 are implemented by sub-modules of the pre-processor. Logs 651 are log files in a database. Corpus 406 relates to technical support for computing systems and the logs 651 are logs for incidents in the corresponding computer system.

Thus, based on the discussion in the preceding paragraph, it will be appreciated that one or more embodiments can be implemented, for example, with a search engine module and a pre-processor module, each embodied on a computer readable storage medium. The search engine module can include sub-modules for building the corpus vocabulary V and topic model T, as well as a query engine sub-module that queries the index. The index can be stored in a data structure persisted on a file system (e.g. hard disk or the like). The pre-processor module can include a word extraction sub-module that implements the logic described with regard to step 653; a decision logic sub-module that implements decision block 655; a generative sub-module 657 that implements the logic described with regard to step 657; and a log traversal sub-module that implements the logic described with regard to step 659. Optionally, further modules and/or submodules implement step 661. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a base query having a plurality of base query terms;
accessing a plurality of problem log files comprising error messages;
extracting words, contained in a corpus vocabulary, from the error messages of the plurality of problem log files;
based on the words extracted from the error messages of the plurality of problem log files, generating a first expanded query from the base query; and
querying the corpus, via a query engine and a corpus index, with a second expanded query related to the first expanded query.

2. The method of claim 1, further comprising determining that none of the query terms is in the corpus vocabulary; wherein the generating comprises, responsive to the determining that none of the query terms is in the corpus vocabulary:
picking one or more most recent ones of the words extracted from the error messages of the plurality of problem log files, having highest relevance to a single topic cluster in the log files, based on a topic model of said corpus; and
replacing the base query with at least one of the words having said highest relevance, to obtain the first expanded query; and
wherein the picking comprises:
selecting given ones of the words from a most recent selection time window;
identifying topics with highest relevance to the given ones of the words;
identifying topic clusters which contain the topics;
selecting a most frequent one of the topic clusters; and
selecting those given ones of the words with the highest relevance to the topics in the topic cluster.

3. The method of claim 2, wherein the topic clustering comprises:
analyzing the log files to extract the words belonging to the corpus vocabulary;
grouping the words belonging to the corpus vocabulary by a measurement time window;

mapping each word in the group of the words to a most relevant topic in the topic model of the corpus; and forming an optimal set of clusters from the set of topics appearing in each group.

4. The method of claim 3, wherein the second expanded query is identical to the first expanded query.

5. The method of claim 3, wherein the first expanded query has a plurality of first expanded query terms and wherein the second expanded query is derived from the first expanded query by:

using the topic model of said corpus, generating a topic for each of the first expanded query terms to obtain a plurality of generated topics;

for each given one of the plurality of generated topics, generating a candidate word from the vocabulary; and adding one or more of the generated candidate words to the first expanded query to obtain the second expanded query, the generated candidate words to be added to the first expanded query having a highest value of conditional probability, given the first expanded query, and exceeding a second threshold.

6. The method of claim 1, wherein the first expanded query has a plurality of first expanded query terms, and wherein the second expanded query is derived from the first expanded query by:

using a topic model of the corpus, generating a topic for each of the first expanded query terms to obtain a plurality of generated topics;

for each given one of the plurality of generated topics, generating a candidate word from the corpus vocabulary; and adding one or more of the generated candidate words to the first expanded query to obtain the second expanded query, the generated candidate words to be added to the first expanded query having a highest value of conditional probability, given the first expanded query, and exceeding a threshold.

7. The method of claim 1, wherein the plurality of problem log files comprises an operating system diagnostic log.

8. A non-transitory computer readable medium comprising computer executable instructions which when executed by a computer cause the computer to perform operations comprising:

obtaining a base query having a plurality of base query terms;

accessing a plurality of problem log files comprising error messages;

extracting words, contained in a corpus vocabulary, from the error messages of the plurality of problem log files;

based on the words extracted from the error messages of the plurality of problem log files, generating a first expanded query from the base query; and querying the corpus, via a query engine and a corpus index, with a second expanded query related to the first expanded query.

9. The non-transitory computer readable medium of claim 8, the operations further comprising determining that none of the query terms is in the corpus vocabulary; wherein the generating comprises, responsive to the determining that none of the query terms is in the corpus vocabulary:

picking one or more most recent ones of the words extracted from the error messages of the plurality of problem log files, having highest relevance to a single topic cluster in the log files, based on a topic model of said corpus; and replacing the base query with at least one of the words having said highest relevance, to obtain the first expanded query; and wherein the picking comprises:

selecting given ones of the words from a most recent selection time window;

identifying topics with highest relevance to the given ones of the words;

identifying topic clusters which contain the topics;

selecting a most frequent one of the topic clusters; and selecting those given ones of the words with the highest relevance to the topics in the topic cluster.

10. The non-transitory computer readable medium of claim 9, wherein the topic clustering comprises:

analyzing the log files to extract the words belonging to the corpus vocabulary;

grouping the words belonging to the corpus vocabulary by a measurement time window;

mapping each word in the group of the words to a most relevant topic in the topic model of the corpus; and forming an optimal set of clusters from the set of topics appearing in each group.

11. The non-transitory computer readable medium of claim 10, wherein the second expanded query is identical to the first expanded query.

12. The non-transitory computer readable medium of claim 10, wherein the first expanded query has a plurality of first expanded query terms and wherein said second expanded query is derived from the first expanded query by:

using the topic model of said corpus, generating a topic for each of the first expanded query terms to obtain a plurality of generated topics;

for each given one of the plurality of generated topics, generating a candidate word from the vocabulary; and adding one or more of the generated candidate words to the first expanded query to obtain the second expanded query, said generated candidate words to be added to the first expanded query having a highest value of conditional probability, given the first expanded query, and exceeding a second threshold.

13. The non-transitory computer readable medium of claim 8, wherein the first expanded query has a plurality of first expanded query terms, and wherein the second expanded query is derived from the first expanded query by:

using a topic model of the corpus, generating a topic for each of the first expanded query terms to obtain a plurality of generated topics;

for each given one of the plurality of generated topics, generating a candidate word from the corpus vocabulary; and adding one or more of the generated candidate words to the first expanded query to obtain the second expanded query, the generated candidate words to be added to the first expanded query having a highest value of conditional probability, given the first expanded query, and exceeding a threshold.

14. The non-transitory computer readable medium of claim 8, wherein the plurality of problem log files comprises an operating system diagnostic log.

15. An apparatus comprising:

a memory;

at least one processor, coupled to said memory; and a non-transitory computer readable medium comprising computer executable instructions which when loaded into the memory configure the at least one processor to perform operations comprising:

obtaining a base query having a plurality of base query terms;

accessing a plurality of problem log files comprising error messages;

extracting words, contained in a corpus vocabulary, from the error messages of the plurality of problem log files;

based on the words extracted from the error messages of the plurality of problem log files, generating a first expanded query from the base query; and querying the corpus, via a query engine and a corpus index, with a second expanded query related to the first expanded query.

16. The apparatus of claim 15, the operations further comprising determining that none of the query terms is in the corpus vocabulary; wherein the generating comprises, responsive to the determining that none of the query terms is in the corpus vocabulary:

picking one or more most recent ones of the words extracted from the error messages of the plurality of problem log files, having highest relevance to a single topic cluster in the log files, based on a topic model of said corpus; and replacing the base query with at least one of the words having said highest relevance, to obtain the first expanded query; and wherein the picking comprises:

selecting given ones of the words from a most recent selection time window;

identifying topics with highest relevance to the given ones of the words;

identifying topic clusters which contain the topics;

selecting a most frequent one of the topic clusters; and selecting those given ones of the words with the highest relevance to the topics in the topic cluster.

17. The apparatus of claim 16, wherein the topic clustering comprises:

analyzing the log files to extract the words belonging to the corpus vocabulary;

grouping the words belonging to the corpus vocabulary by a measurement time window;

mapping each word in the group of the words to a most relevant topic in the topic model of the corpus; and forming an optimal set of clusters from the set of topics appearing in each group.

18. The apparatus of claim 17, wherein the second expanded query is identical to the first expanded query.

19. The apparatus of claim 17, wherein the first expanded query has a plurality of first expanded query terms and wherein the second expanded query is derived from the first expanded query by:

using the topic model of said corpus, generating a topic for each of the first expanded query terms to obtain a plurality of generated topics;

for each given one of the plurality of generated topics, generating a candidate word from the vocabulary; and adding one or more of the generated candidate words to the first expanded query to obtain the second expanded query, the generated candidate words to be added to the first expanded query having a highest value of conditional probability, given the first expanded query, and exceeding a second threshold.

20. The apparatus of claim 15, wherein the first expanded query has a plurality of first expanded query terms, and wherein the second expanded query is derived from the first expanded query by:

using a topic model of the corpus, generating a topic for each of the first expanded query terms to obtain a plurality of generated topics;

for each given one of the plurality of generated topics, generating a candidate word from the corpus vocabulary; and adding one or more of the generated candidate words to the first expanded query to obtain the second expanded query, the generated candidate words to be added to the first expanded query having a highest value of conditional probability, given the first expanded query, and exceeding a threshold.

* * * * *